June 2, 1931.          W. R. JEAVONS ET AL          1,808,231
PROCESS OF TREATING CLAY
Filed May 11, 1928
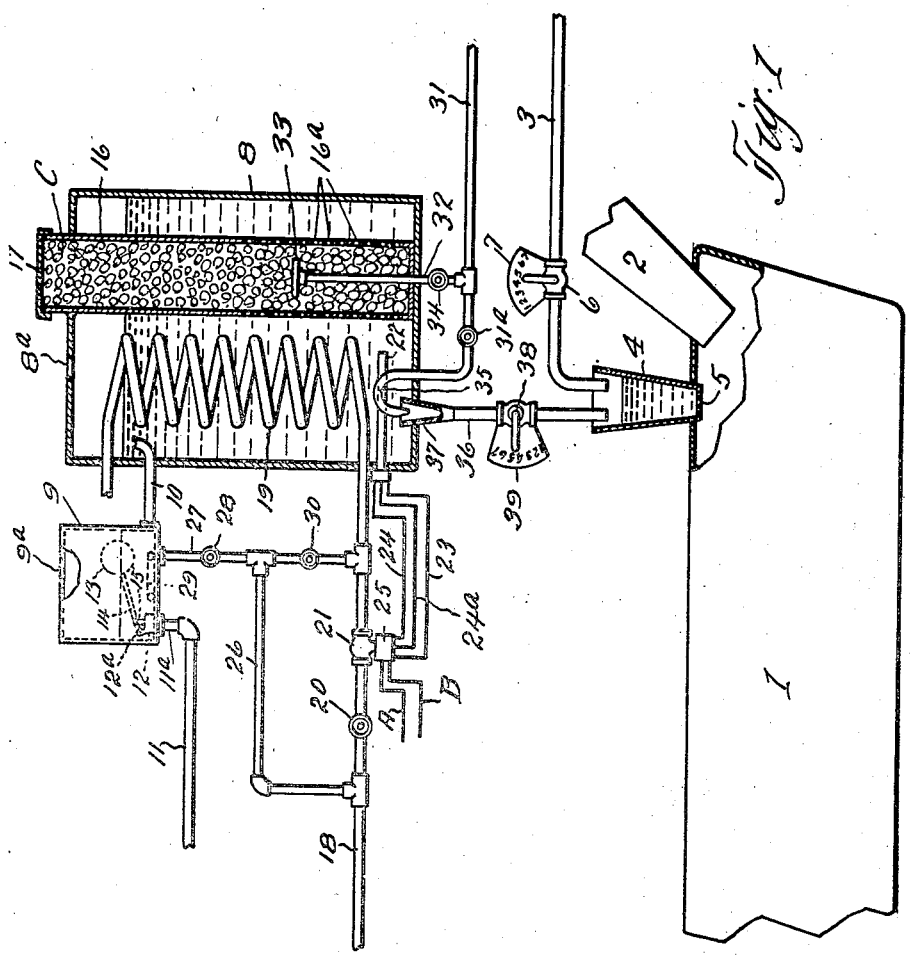
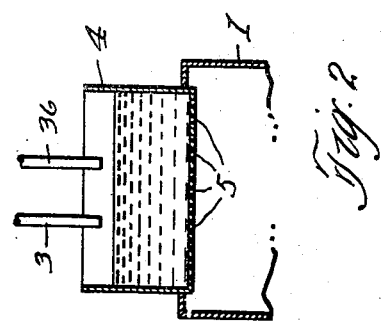

Patented June 2, 1931

1,808,231

UNITED STATES PATENT OFFICE

WILLIAM R. JEAVONS, OF CLEVELAND HEIGHTS, AND MAHLON J. RENTSCHLER, OF WILLOUGHBY, OHIO

PROCESS OF TREATING CLAY

Application filed May 11, 1928. Serial No. 277,029.

This invention relates to a process of treating clay for the purpose of preventing the formation of scum on the brick or other ware formed therefrom.

The scumming or efflorescence as commonly observed on building bricks and tiles is caused by the deposition of soluble salts (usually $MgSO_4$ and $CaSO_4$) on the surfaces thereof. These salts are usually contained in the clay from which the brick or other ware is made, as well as, to a considerable extent, in the water used for mixing or pugging the clay. Moisture due to weathering dissolves these salts and brings them to the surface of the bricks and tiles, resulting in the production of the undesirable and unsightly scum formation referred to.

It is the object of our invention to provide a process of treating clay which will enable the conversion of the soluble sulphates therein into insoluble barium sulphates, to be accomplished in a convenient, effective and economical manner. Further and more limited objects of the invention will appear hereinafter in connection with the detailed description of the said process and apparatus.

In the drawings there is shown an apparatus or system whereby the clay is tempered with a solution of barium hydrate during the pugging operation, the particular barium compound referred to being basic and active and capable of quickly and effectively converting the soluble sulphates in the clay into insoluble barium sulphate.

In the said drawings, Fig. 1 represents a diagrammatic sectional elevation of an apparatus or system for realizing our invention; and Fig. 2 a detail in vertical section through the receptacle by which the pugging liquid is distributed to the clay in the pug mill.

Describing the parts in the said drawings by reference characters, 1 indicates a pug mill of the usual construction, the same being provided with a chute 2 by which clay is fed thereinto. 3 denotes a pipe through which the pugging water is delivered into the distributing receptacle 4, which receptacle extends transversely across the end of the mill, adjacent to the chute 2, and is provided in its bottom with apertures 5 arranged to distribute liquid therefrom evenly across the clay therebelow. The pipe 3 is provided with a valve 6, by means of which and a scale 7 the supply of water to the receptacle 4 may be accurately proportioned.

8 denotes a tank to which water is delivered from a float tank 9, and 10 a pipe extending from the float tank into the former tank. Water for the float tank is supplied through a pipe 11 having its delivery end $11^a$ projecting upwardly through the bottom of the tank and there provided with an upwardly seating valve, the casing whereof is indicated at 12, the said valve being operated by means of a float 13 and an arm 14 connected to the valve stem 15 and pivotally connected at the end opposite the float to a projection $12^a$ on the casing. The valve and the float may be of any ordinary or standard type and need no further detailed description. The tank 9 is provided in the top with a vent $9^a$.

Extending through the top of the tank 8 and to the bottom thereof is a container 16, the lower portion of the container being perforated, as indicated at $16^a$ and the top of the container being provided with a cover 17. 18 denotes a steam pipe which extends through the side of the tank 8 and communicates with or is formed into a coil 19 therein. This pipe is provided with an ordinary hand-operated valve 20 and a valve 21 which is adapted to be operated by a thermostat 22, which, through the wires 23, 24 and $24^a$, controls the current supplied to a motor within the casing 25 through the line wires A and B in such manner as to operate the motor (not shown) to cause it to open and close the valve 21 in accordance with the temperature in the tank. Thermostatic apparatus for operating motors in the manner described are well known to those skilled in the art, instances being the so-called "Honeywell" thermostat and the "Regitherm" thermostat; hence detailed description of the thermostat and motor is unnecessary. From the pipe 18 pipes 26 and 27 are adapted to deliver steam through a valve 28 into a coil 29 in the tank 9. The pipe 27 may also communicate with the pipe 18 at a point between the valve 21 and the tank through a valve 30.

31 denotes a pipe for live steam which is adapted to be placed in communication with the perforated part of the container 16 by a vertical branch 32 and a distributing head 33 in the said container. The branch 32 is provided with a valve 34.

Beyond the branch 32, the pipe 31 is extended upwardly through the bottom of the tank 8 and is there bent into gooseneck form, as indicated at 35, the end of the pipe terminating in a nozzle which is directed into a funnel 37 at the upper end of a pipe 36, the lower end of which pipe delivers into the distributing receptacle 4. The part of the pipe 31 beyond the branch 32 is provided with a valve $31^a$; and the pipe 36 is provided with a valve 38, by means of which and a scale 39, the proportion of liquid supplied through the pipe 36 to the distributing receptacle 4 may be accurately determined.

In carrying out our process in and through the apparatus described herein, the receptacle 16 will be filled with barium hydrate indicated at C. The water for dissolving these crystals will be supplied through the pipe 11 into the tank 9 where, being heated by the steam supplied through the coil 29 and pipes 18, 26 and 27, any carbon dioxide therein will be driven off and the water, thus freed of carbon dioxide, will be delivered into the tank 8, the level of the liquid being maintained in the latter tank by means of the float 13. The water in the tank 8 may be heated additionally by steam supplied through the pipe 18 and valves 20 and 21 to the coil 19. The temperature at which this water shall be maintained will be controlled by the thermostat 22 operating the valve 21 in a well known manner.

The purpose of maintaining the water at a predetermined temperature in the tank 3 is to facilitate the solution of standard strength. A temperature of from 105° F. to 175° F. will ordinarily suffice to expel the carbon dioxide from the water in the tank 9 and will facilitate the solution of the barium hydrate in the tank 8. By heating the water to a higher temperature it will expel the carbon dioxide more quickly in the tank 9 and will make a more concentrated solution of barium hydrate in the tank 8. The purpose of driving off carbon dioxide from the water employed for the barium hydrate solution is to prevent the formation of barium carbonate which is difficultly soluble in water. The tank 8 is preferably provided with a vent $8^a$ through which any carbon dioxide that may be liberated in said tank may escape. The solution in the tank 8 is delivered through the funnel 37, pipe 36, and valve 28 into the distributing receptacle 4, where it is mingled in definite proportions with the pugging water supplied through the pipe 3 and the valve 8. It has been found that a proportion of barium hydrate to the clay employed for the making of brick and tile of from $\frac{1}{10}$th to 4 per cent of the hydrate to the clay entering the brick will be sufficient to convert all of the soluble sulphates in the clay into insoluble barium sulphate. In a brick clay containing, say calcium sulphate and magnesium sulphate, which are two of the most common scum-producing constituents in present brick clays, the barium hydrate will act as follows:

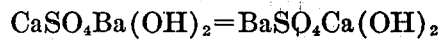
$CaSO_4 Ba(OH)_2 = BaSO_4 Ca(OH)_2$

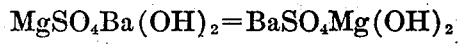
$MgSO_4 Ba(OH)_2 = BaSO_4 Mg(OH)_2$

Should the apertures $16^a$ become clogged, as by an accumulation of barium hydrate recrystallizing after solution, live steam can be supplied to the interior of the receptacle 16 through the pipes 31 and 32 and the distributer 33. This steam will raise the temperature of the water in the vicinity of the said receptacle to a point which will effect speedy solution of the crystals, thus enabling the operation to proceed. In like manner, should the funnel 37 be clogged by an accumulation of such crystals, live steam supplied through the gooseneck 35 will dissolve the crystals quickly, and the apparatus may thereafter function in its usual manner.

By virtue of the valves 6 and 38 and the scales 7 and 39, the proportions of barium hydrate solution and pugging water can be accurately proportioned so that the requisite amount of barium hydrate to convert the solution sulphates into insoluble barium sulphate may be incorporated with the pugging water directly into the clay in the pug mill.

The process herein is capable of continuous operation, the solution of barium hydrate of desired strength being produced continuously in the tank 8 and being supplied continuously therefrom at a definite rate to the distributing box or receptacle 4.

If desired, a small jet of live steam may be supplied continuously to the funnel 37 to superheat the solution fed through the pipe 36.

Having thus described our invention, what we claim is:—

1. The herein described process of treating clay which consists in dissolving barium hydrate in water free from carbon dioxide and pugging a definite proportion of such solution into the clay.

2. The herein described process of treating clay which consists in continuously dissolving barium hydrate in water maintaining the water at an elevated temperature to free the same from carbon dioxide and to more readily dissolve the barium hydrate and in pugging a definite proportion of such solution into the clay.

3. The herein described process of treating clay which consists in heating a continuous flow of water to at least 105° F. to drive off carbon dioxide therefrom, continually dissolving barium hydrate in the water thus heated and freed, and pugging into the clay a definite proportion of such solution.

4. The herein described process of treating clay which consists in adding to the water employed for pugging the clay a definite proportion of barium hydrate dissolved in water free from carbon dioxide and pugging the clay with the resultant aqueous mixture.

5. The herein described process of treating clay which consists in dissolving barium hydrate in heated water and pugging into the clay a definite proportion of the resultant solution.

6. The herein described process of treating clay which consists in maintaining a supply of barium hydrate solution of definite strength and freed from carbon dioxide and delivering such solution at a definite rate to the clay during the pugging of the latter.

7. The herein described process of treating clay which consists in maintaining a supply of barium hydrate solution of definite strength and freed from carbon dioxide and delivering such solution at a definite rate to the water employed for pugging the clay.

8. The herein described process of treating clay which consists in subjecting to the contact of water freed from carbon dioxide a mass of barium hydrate crystals protected from atmospheric deterioration thereby to produce and maintain a solution of definite strength, and feeding such solution in a definite proportion to the clay to be pugged thereinto.

9. The herein described process of treating clay which consists in subjecting to the contact of water freed from carbon dioxide and maintained at a definite temperature a mass of barium hydrate crystals protected from atmospheric deterioration thereby to produce and maintain a solution of definite strength, and feeding such solution in a definite proportion to the clay to be pugged thereinto.

10. The herein described process of treating clay which consists in submerging an excess of barium hydrate crystals in water freed from carbon dioxide, stabilizing the strength of the resultant solution by maintaining the water supplied for such solution at a definite temperature, and feeding the solution in definite proportion to the clay to be conditioned thereby.

11. The herein described process of treating clay which consists in dissolving barium hydrate in water having a definite temperature thereby to produce a solution of correspondingly definite strength, and supplying such solution in definite proportion to the clay to be conditioned.

12. The herein described process which consists in producing and maintaining a supply of concentrated barium hydrate solution in water freed from carbon dioxide, maintaining the solution at a definite temperature thereby to maintain the solution at a definite strength, and supplying the solution thus formed in a definite proportion to the clay to be conditioned.

13. The process of treating clay which consists in forming a solution of barium hydrate of definite strength by the temperature of the solvent water, and supplying such solution in a definite proportion to the clay to be conditioned.

14. The process of treating clay which consists in dissolving barium hydrate crystals in water, maintaining the solution at a definite temperature and supplying the solution in definite proportion to the clay to be conditioned.

15. The herein described process of treating clay which consists in passing a water through a container, continuously supplying to said container barium hydroxide in a quantity to maintain in said container some of the barium hydroxide in an undissolved state, drawing off the water with the barium hydrate dissolved therein at a predetermined rate, and pugging a definite proportion of the same into the clay.

16. The herein described process of treating clay which consists in passing water through a container, continuously supplying to said container barium hydroxide in a quantity to maintain in said container some of the barium hydroxide in an undissolved state, maintaining the water at a temperature above 105° F. to free the same from carbon dioxide, drawing off the water with the barium hydrate dissolved therein, at a predetermined rate, and pugging a definite proportion of the same into the clay.

17. The herein described process of treating clay which consists in passing water through a container, continuously supplying to said container barium hydroxide in a quantity to maintain in said container some of the barium hydroxide in an undissolved state, controlling the temperature between predetermined limits above 105° to effect the desired solution of the hydrate and to free the water from carbon dioxide, drawing off the water with the barium hydrate dissolved therein at a predetermined rate, and pugging a definite proportion of the same into the clay.

In testimony whereof, we hereunto affix our signatures.

WILLIAM R. JEAVONS.
MAHLON J. RENTSCHLER.